United States Patent
Maeda et al.

(10) Patent No.: US 10,725,605 B2
(45) Date of Patent: Jul. 28, 2020

(54) DISPLAY CONTROL UNIT AND DISPLAY CONTROL PROGRAM PRODUCT

(71) Applicant: DENSO CORPORATION, Kariya, Aichi-pref. (JP)

(72) Inventors: Masahito Maeda, Kariya (JP); Kensuke Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 331 days.

(21) Appl. No.: 15/325,524

(22) PCT Filed: Jun. 23, 2015

(86) PCT No.: PCT/JP2015/003130
§ 371 (c)(1),
(2) Date: Jan. 11, 2017

(87) PCT Pub. No.: WO2016/009593
PCT Pub. Date: Jan. 21, 2016

(65) Prior Publication Data
US 2017/0160877 A1 Jun. 8, 2017

(30) Foreign Application Priority Data
Jul. 14, 2014 (JP) .................................. 2014-144176

(51) Int. Cl.
*G06F 3/0481* (2013.01)
*G06F 9/445* (2018.01)

(52) U.S. Cl.
CPC ............ *G06F 3/0481* (2013.01); *G06F 9/445* (2013.01); *G06F 9/44505* (2013.01)

(58) Field of Classification Search
CPC ........ G06F 3/0481; G06F 9/445; G06F 21/00; G06F 3/0484; G06F 9/4401; G06F 8/65;
(Continued)

(56) References Cited

U.S. PATENT DOCUMENTS 8,560,822 B1 * 10/2013 Chan ..................... G06F 8/65
713/1
9,868,397 B2 * 1/2018 Maeda ..................... B60R 1/00
(Continued)

FOREIGN PATENT DOCUMENTS

| JP | 2006309664 A | * | 11/2006 |
| JP | 2012099924 A | | 5/2012 |
| JP | 2014222461 A | | 11/2014 |

*Primary Examiner* — Andrew L Tank
(74) *Attorney, Agent, or Firm* — Harness, Dickey & Pierce, P.L.C.

(57) ABSTRACT

A display control unit displays, in a case where the display control unit is in a startup state or in an abnormal operation state of a general purpose application, a display window of a dedicated middleware even when a startup of the dedicated middleware is completed and a startup of a general purpose middleware is not completed. With this configuration, the user operation is allowed to perform operation to the general purpose application and is not required to wait until the startup of the general purpose middleware is completed. When the startup of the general purpose middleware is completed, a display window of the general purpose application which includes display window data transferred from the general purpose middleware is displayed. Thus, information related to the general purpose application can be promptly provided to a user.

8 Claims, 9 Drawing Sheets

(58) Field of Classification Search
CPC .......... G07C 5/008; H04L 67/12; H04W 4/40; B60R 16/037
See application file for complete search history.

(56) References Cited

U.S. PATENT DOCUMENTS

| | | | |
|---|---|---|---|
| 2010/0229184 A1* | 9/2010 | Satou | G06F 9/445 719/318 |
| 2011/0107349 A1* | 5/2011 | Kishita | G06F 9/44 719/313 |
| 2012/0086857 A1* | 4/2012 | Kim | G06F 9/4401 348/563 |
| 2013/0205412 A1* | 8/2013 | Ricci | G06F 3/0484 726/29 |
| 2014/0111698 A1* | 4/2014 | Jain | G06F 3/061 348/734 |
| 2015/0133164 A1* | 5/2015 | Song | G06Q 10/10 455/456.3 |
| 2016/0103687 A1* | 4/2016 | Matsuyama | G06F 9/445 718/100 |

\* cited by examiner

DISPLAY CONTROL UNIT AND DISPLAY CONTROL PROGRAM PRODUCT

CROSS REFERENCE TO RELATED APPLICATIONS

This application is a U.S. National Phase Application under 35 U.S.C. 371 of International Application No. PCT/JP2015/003130 filed on Jun. 23, 2015 and published in Japanese as WO 2016/009593 A1 on Jan. 21, 2016. This application is based on and claims the benefit of priority from Japanese Patent Application No. 2014-144176 filed on Jul. 14, 2014. The entire disclosures of all of the above applications are incorporated herein by reference.

TECHNICAL FIELD

The present disclosure relates to a display control unit and a display control program product each of which controls a screen display on a display unit equipped to a vehicle.

BACKGROUND ART

In recent years, in mobile terminals such as a smartphone or a tablet, with the use of a general purpose operating system, a release frequency of an application program (hereinafter referred to as "application") is increased, and the addition or deletion of the application is facilitated. In addition, with the use of a high-performance CPU (central processing unit) in the mobile terminal, multiple application windows can be switched and multiple applications can be executed in multitask manner (for example, refer to Patent Literature 1).

Sometimes, the application (hereinafter referred to as "general purpose application") operates on the mobile terminal is reset during the operation or hung-up (display screen lock) occurs to the general purpose application. This causes a concern about the operation stability. For that reason, when the general purpose application is operated on a vehicular device equipped to the vehicle and the general purpose application is used for control of the vehicle, the operation stability of the vehicle-mounted device may be impaired. Meanwhile, even if the operation stability is ensured right after shipping, the operation stability of the vehicle-mounted device may be impaired due to the general purpose application which is downloaded from a server and added after shipping. Under the above circumstances, it is conceivable to mount the application (hereinafter referred to as "dedicated application") of the vehicle side (cooperated with the vehicle) and the general purpose application in the vehicle-mounted device, separately. Specifically, it is conceivable to implement a dedicated middleware capable of executing the dedicated application, a general purpose middleware capable of executing the general purpose application, and an interface that exchanges data between the dedicated middleware and the general purpose middleware. According to the configuration described above, various kinds of general purpose applications are available in the vehicle-mounted device while minimizing an adverse effect on the dedicated application.

However, in the configuration in which the dedicated middleware and the general purpose middleware are implemented, a situation in which the startup of the dedicated middleware is completed while the startup of the general purpose middleware is not completed is likely to occur. For example, in the configuration where the dedicated middleware starts up firstly at the time of starting up the device and the general purpose middleware starts up after the startup of the dedicated middleware is completed, the general purpose middleware starts up after the startup of the dedicated middleware is completed. In other words, during a period before the startup of the general purpose middleware is completed, the startup of the dedicated middleware is completed but the startup of the general purpose middleware is not completed. Sometimes, the general purpose middleware is reset (restarted) due to a factor such as abnormal operation of the general purpose application even after the startup of the general purpose middleware is completed. Similarly, in this case, the startup of the dedicated middleware is completed while the startup of the general purpose middleware is not completed during a period before the restart of the general purpose middleware is completed. When the situation in which the startup of the dedicated middleware is completed while the startup of the general purpose middleware is not completed occurs, a user who intends to perform an operation of the general purpose application has to wait until the startup of the general purpose middleware is completed. Thus, above-described configuration may fail to provide a quick service of the general purpose application to the user.

PRIOR ART LITERATURE

Patent Literature

[Patent Literature 1] JP 2012-99924 A

SUMMARY OF INVENTION

In view of the foregoing difficulties, it is an object of the present disclosure to provide a display control unit and a display control program product each of which is capable of providing a quick service of a general purpose application to a user, and capable of increasing usability.

According to an aspect of the present disclosure, a display control unit includes a dedicated middleware executing a dedicated application program on vehicle-side, a general purpose middleware executing a general purpose application program, and an interface exchanging data between the dedicated middleware and the general purpose middleware. The dedicated middleware has a function of promoting the general purpose middleware to start an execution of the general purpose application program, and the dedicated middleware performs a window display control of a display unit. In a state where a startup of the dedicated middleware is completed and a startup of the general purpose middleware is not completed, the dedicated middleware displays, on the display unit, a window which is capable of accepting a user operation for activating the general purpose application program. When the startup of the dedicated middleware is completed and the startup of the general purpose middleware is completed, the dedicated middleware displays, on the display unit, a window related to the general purpose application program, and the window related to the general purpose application program includes display window data transferred from the general purpose middleware through the interface.

According to the above display control unit, the service of the general purpose application program can be quickly provided to the user, and the usability of the user can be increased.

According to another aspect of the present disclosure, a display control program product stored in a computer-readable non-transitory tangible storage medium is provided. The display control program product includes instructions to be executed by a computer included in a display control unit. The display control unit includes a dedicated middleware executing a dedicated application program on vehicle-side, a general purpose middleware executing a general purpose application program, and an interface exchanging data between the dedicated middleware and the general purpose middleware. The dedicated middleware has a function of promoting the general purpose middleware to start an execution of the general purpose application program and performing a window display control of a display unit. The instructions comprised in the display control program product for implementing, in a state where a startup of the dedicated middleware is completed and a startup of the general purpose middleware is not completed, controlling the dedicated middleware to display, on the display unit, a window which is capable of accepting a user operation for activating the general purpose application program, and when the startup of the dedicated middleware is completed and the startup of the general purpose middleware is completed, controlling dedicated middleware to display, on the display unit, a window related to the general purpose application program, wherein the window related to the general purpose application program includes display window data transferred from the general purpose middleware through the interface.

According to the above display control program product, the service of the general purpose application program can be quickly provided to the user, and the usability of the user can be increased.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Figure 1:
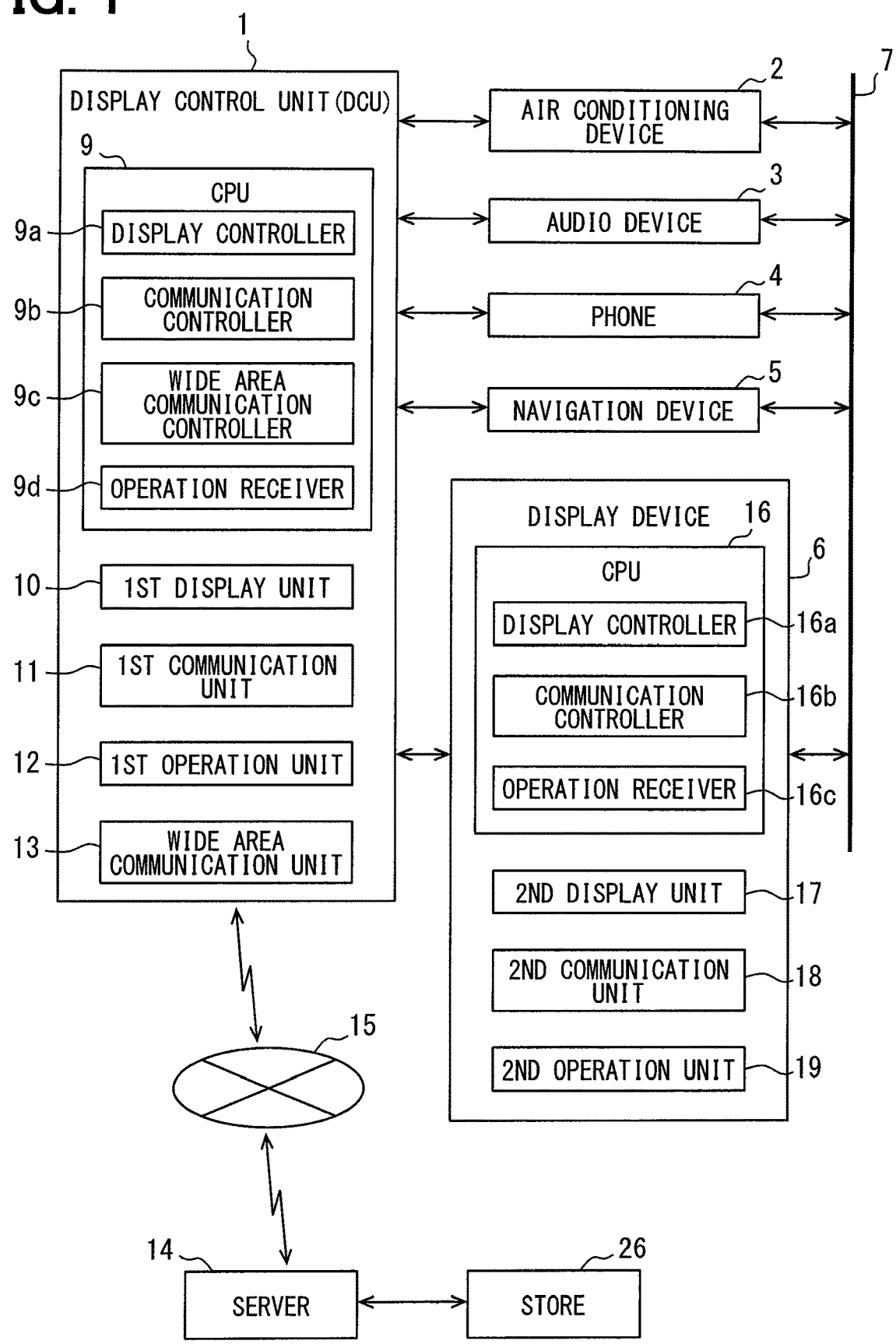
FIG. 1 is a functional block diagram illustrating an embodiment of the present disclosure.

Hereinafter, a display control unit mountable to a vehicle according to an embodiment of the present disclosure will be described with reference to the drawings. A display control unit (DCU (display controller)) 1 is connected to an air conditioning device 2, an audio device 3, a phone 4, a navigation device 5, and a display device 6. The display control unit 1 is connected to a bus line 7, and can receive various pieces of data from the bus line 7. In addition, the air conditioning device 2, the audio device 3, the phone 4, the navigation device 5, and the display device 6 are connected to the bus line 7, and can receive various pieces of data from the bus line 7.

As a configuration of a hardware 8 (refer to FIG. 2), the display control unit 1 includes a CPU (central processing unit) 9 that performs an overall operation control, a first display unit 10 provided by, for example, a color liquid crystal display, a first communication unit 11 that performs a data communication with the display device 6, a first operation unit 12 including a variety of keys operable by the user, and a wide area communication unit 13 that performs a data communication with a server 14 through a communication network 15. The variety of keys in the first operation unit 12 is configured by touch keys displayed on the first display unit 10.

As the configuration of the hardware, the display device 6 includes a CPU 16 that controls the operation of the overall device, a second display unit 17 provided by, for example, a color liquid crystal display, a second communication unit 18 that performs a data communication with the display control unit 1, and a second operation unit 19 including a variety of keys operable by the user. The variety of keys in the second operation unit 19 includes touch keys displayed on the second display unit 17, and hard keys (mechanical keys) such as an audio key 19a and a menu key 19b illustrated in FIGS. 5 to 7, which will be described later. The first display unit 10 functions as a main display unit, the second display unit 17 functions as a sub display unit, and a display window of the first display unit 10 and a display window of the second display unit 17 are displayed in juxtaposition vertically.

The CPU 9 of the display control unit 1 includes a display controller 9a, a communication controller 9b, a wide area communication controller 9c, and an operation receiver 9d corresponding, respectively, to functions of the CPU 9. The display controller 9a controls a display window displayed on the first display unit 10. The display controller 9a receives, for example, display window data from the air conditioning device 2, the audio device 3, the phone 4, and the navigation device 5 to display, on the first display unit 10, an air conditioning operation window, an audio operation window, a phone operation window, an operation window related to a navigation process or a map window. The display controller 9a transfers data of these display windows to the display device 6 from the first communication unit 11 to display these windows on the second display unit 17. The communication controller 9b controls a data communication with the display device 6. The wide area communication controller 9c controls the data communication between the wide area communication unit 13 and the server 14 through the communication network 15, and can download, through the communication network 15, a general purpose application 25 from a store 26 to the wide area communication unit 13. The store 26 is a provider of the general purpose application 25. Meanwhile, the general purpose application 25 per se can download the general purpose application 25 to the communication unit 13 from the store 26 through the communication network 15. The operation receiver 9d receives the operation performed by the user on the first operation unit 12.

The CPU 16 of the display device 6 includes a display controller 16a, a communication controller 16b, and an operation receiver 16c corresponding, respectively, to functions of the CPU 16. The display controller 16a controls the window displayed on the second display unit 17. The communication controller 16b controls the data communication with the display control unit 1. The operation receiver 16c receives operation performed by the user on the second operation unit 19.

Figure 2:
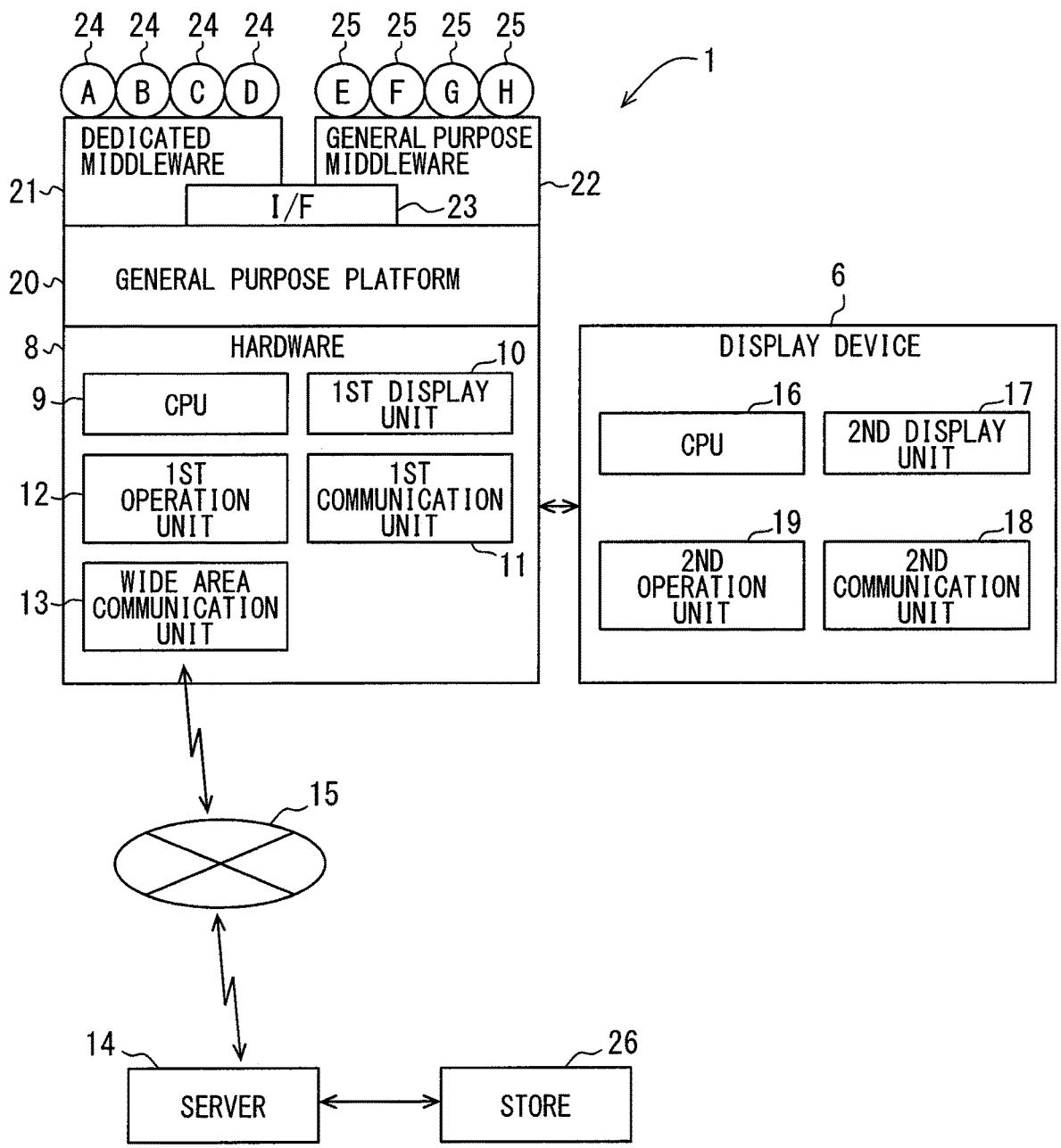
FIG. 2 is a diagram illustrating a configuration of hardware and software.

As the configuration of a software, as illustrated in FIG. 2, the display control unit 1 implements a general purpose platform 20 on a hardware 8, and implements, on the general purpose platform 20, a dedicated middleware 21, a general purpose middleware 22, and an interface (I/F) 23. The general purpose platform 20 is located on a higher level of the hardware 8. The dedicated middleware 21 operates on the general purpose platform 20, and can execute a dedicated application program (hereinafter referred to as "dedicated application") 24 on the vehicle side (herein, vehicle side means mounted to the vehicle in advance and associated with the vehicle). The general purpose middleware 22 is a middleware that operates on the general purpose platform 20, and can execute the general purpose application program (hereinafter referred to as "general purpose application") 25 that is delivered from, for example, an external source. The interface 23 exchanges data between the dedicated middleware 21 and the general purpose middleware 22.

The dedicated applications 24 (A, B, C, D in FIG. 2) installed on the dedicated middleware 21 include, for example, an air conditioning application for providing an air conditioning function, an audio application for providing an audio function, a phone application for providing a phone function, and a navigation application for providing a navigation function. The general purpose applications 25 (E, F, G, H in FIG. 2) installed on the general purpose middleware 22 include, for example, a social network application, a communication application, a web search application, and an internet radio application. The general purpose applications 25 are applications that can be easily added or deleted by the user operation.

In the above configuration, the display control unit 1 starts up with an electric power supplied from a vehicle battery (not illustrated) as an operating power. The CPU 9 monitors an input of a startup command signal from the bus line 7 in a deactivated state of the device, and waits for the generation of a startup request for the display control unit 1. When the CPU 9 determines a reception of the startup command signal from the bus line 7, for example, upon the user getting on the vehicle and an ACC switch of the vehicle turning from off to on, the CPU 9 determines that the startup request for the display control unit 1 is generated. When the CPU 9 determines that the startup request for the display control unit 1 is generated, the CPU 9 notifies the dedicated middleware 21 of the startup command to start up the dedicated middleware 21. After the CPU 9 starts up the dedicated middleware 21, the CPU 9 notifies the general purpose middleware 22 of the startup command, and starts up the general purpose middleware 22. The dedicated middleware 21 has a function of prompting the general purpose middleware 22 to start up the execution of the general purpose application 25 after the startup of the dedicated middleware 21 is completed.

In the configuration where the general purpose middleware 22 starts up after the completion of the dedicated middleware's startup as described above, there is a problem that the user is required to wait for the operation of the general purpose application until the startup of the general purpose middleware 22 is completed as described above. In addition, such a problem may occur even in the case where the general purpose middleware 22 is reset (restarted) due to a factor such as the abnormal operation of the general purpose application 25 not only at the time of starting up the device but also even during the normal operation (after the startup of the general purpose middleware 22 is completed). With consideration of this point, the dedicated middleware 21 and the general purpose middleware 22 are configured to perform the following process.

The following will describe operations of the above-described configuration with reference to FIGS. 3 to 9. In this example, processes performed by the dedicated middleware 21 and the general purpose middleware 22 in each of the device starting operation and the normal operation will be described. The process performed by the dedicated middleware 21 includes a process of the display control program. A description will be given assuming that the music application was in activated state when the ACC was switched from on to off in the previous operation (last operation).

Figure 3:
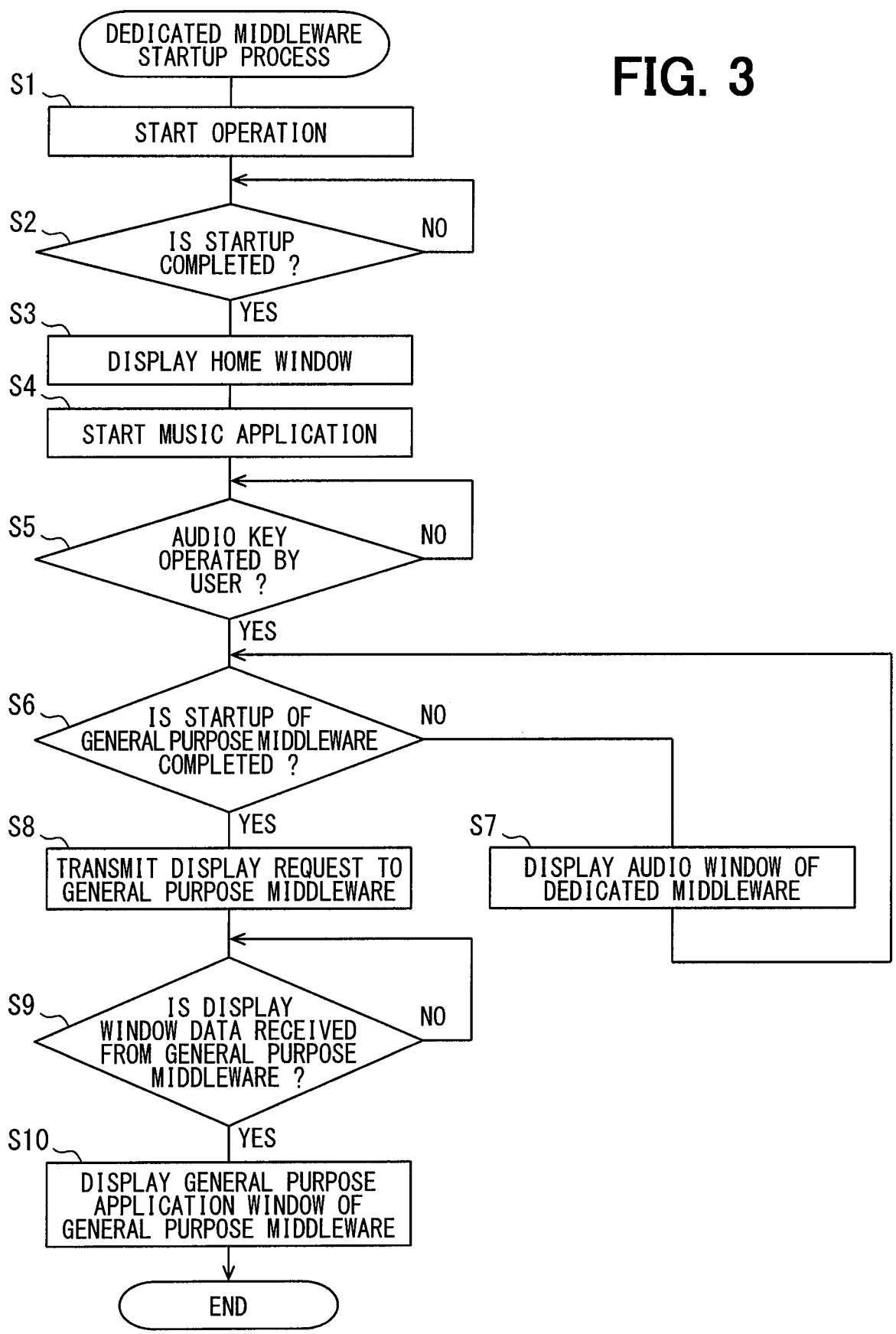
FIG. 3 is a flowchart illustrating a startup process of a dedicated middleware.

(1) During Device Startup (1-1) Process Performed by Dedicated Middleware 21 During Device Startup (Refer to FIG. 3)

Figure 5:
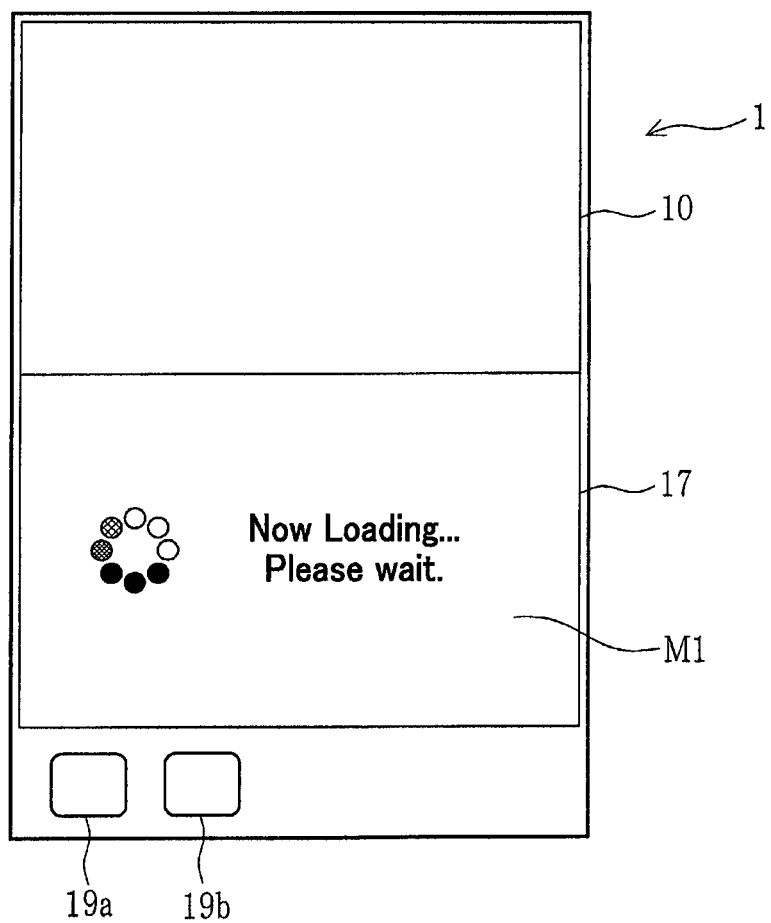
FIG. 5 is a diagram illustrating a home window.

When the dedicated middleware 21 activates the startup process upon receiving the startup command from the CPU 9, the dedicated middleware 21 performs a startup operation (S1), specifically, performs a predetermined startup procedure, and waits for the completion of startup (S2). When the dedicated middleware 21 properly completes the predetermined startup procedure from start to finish, and determines that the startup is completed, the dedicated middleware 21 allows a home window M1 to be displayed (drawn) on the second display unit 17 as illustrated in FIG. 5 (S3), and starts up the music application loaded in the dedicated middleware 21 (S4). In other words, for example, in a case where the dedicated middleware 21 reproduced the music data recorded on a music recording medium such as a CD (compact disc) (registered trademark) at the time when the ACC switch was turned from on to off in the previous operation (last operation), by starting up the music application which was in the activated state at the time when the ACC switch was turned from on to off in the previous operation (last operation), the dedicated middleware 21 can restart the reproduction of the music data. The dedicated middleware 21 displays a message which promotes a standby of the music application window on the home window M1.

Then, the dedicated middleware 21 monitors whether the audio key 19a is operated by the user or not (whether the user operation indicative of a display request for the display window related to the general purpose application is received or not) (S5). When the dedicated middleware 21 determines that the audio key 19a is operated by the user (S5: YES), the dedicated middleware 21 determines whether startup of the general purpose middleware 22 is completed or not (S6).

Figure 6:
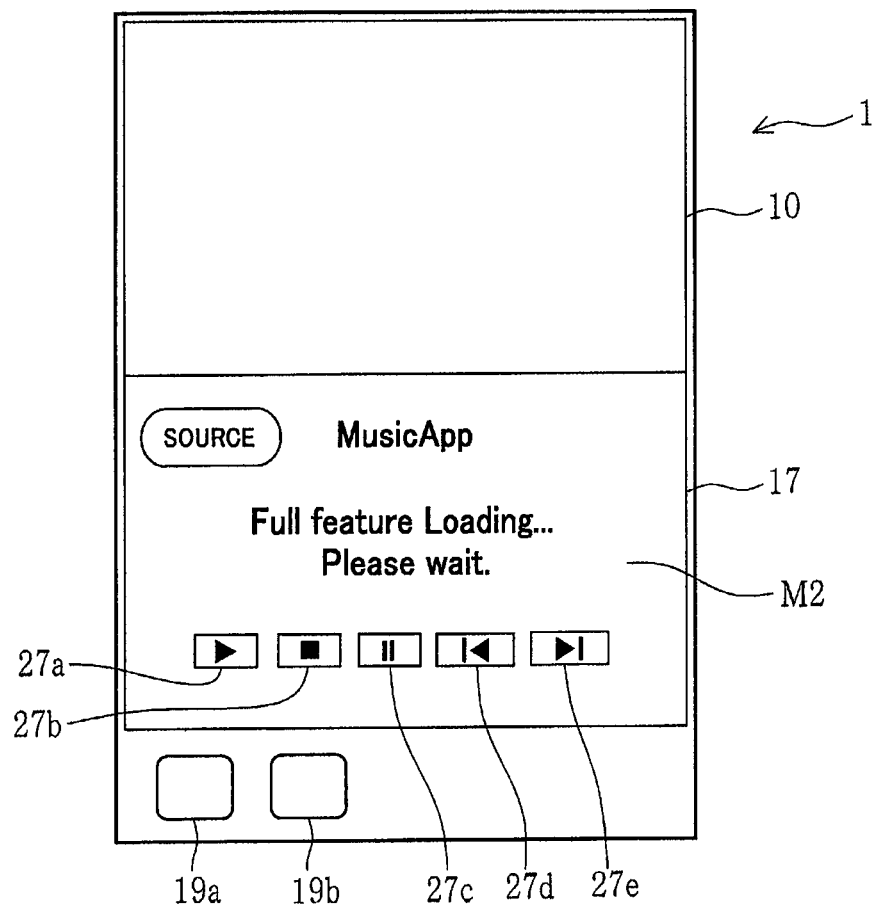
FIG. 6 is a diagram illustrating an audio window of the dedicated middleware.

When the dedicated middleware 21 has not yet received a startup completion notice from the general purpose middleware 22 at that time, and determines that the startup of the general purpose middleware 22 has not been completed (S6: NO), the dedicated middleware 21 displays (draws) an audio window M2 of the dedicated middleware 21 on the second display unit 17 as illustrated in FIG. 6 (S7, first procedure). The audio window M2 of the dedicated middleware 21 can accept the user operation related to the general purpose application 25. When the dedicated middleware 21 restarts the reproduction of the music data recorded on the music recording medium, the dedicated middleware 21 displays a play key 27a, a stop key 27b, a pause key 27c, a forward skip key 27d, and a reverse skip key 27e on the audio window M2 of the dedicated middleware 21. In this state, when the dedicated middleware 21 determines that the user operates any one of those keys 27a to 22e, the dedicated middleware 21 controls the operation of the music application according to the operation made by the user on the key. For example, when the dedicated middleware 21 determines that the user operates the forward skip key 27d, the dedicated middleware 21 skips the music data to be reproduced in the forward direction.

The dedicated middleware 21 continues to display the audio window M2 of the dedicated middleware 21 on the second display unit 17 until the startup of the general purpose middleware 22 is completed. In other words, the user can control the operation (reproduction or stop) of the music application during a period before the startup completion of the general purpose middleware 22. Meanwhile, in the present embodiment, when the reproduction of the music data is restarted, the play key 27a and the stop key 27b can be displayed on the audio window M2 of the dedicated middleware 21, and basic functions such as reproduction or stop can be operated. For example, when an output of a radio broadcast is restarted, a key for setting a reception frequency is displayed on the audio window M2 of the dedicated middleware 21, and the basic function such as tuning can be operated.

Figure 7:
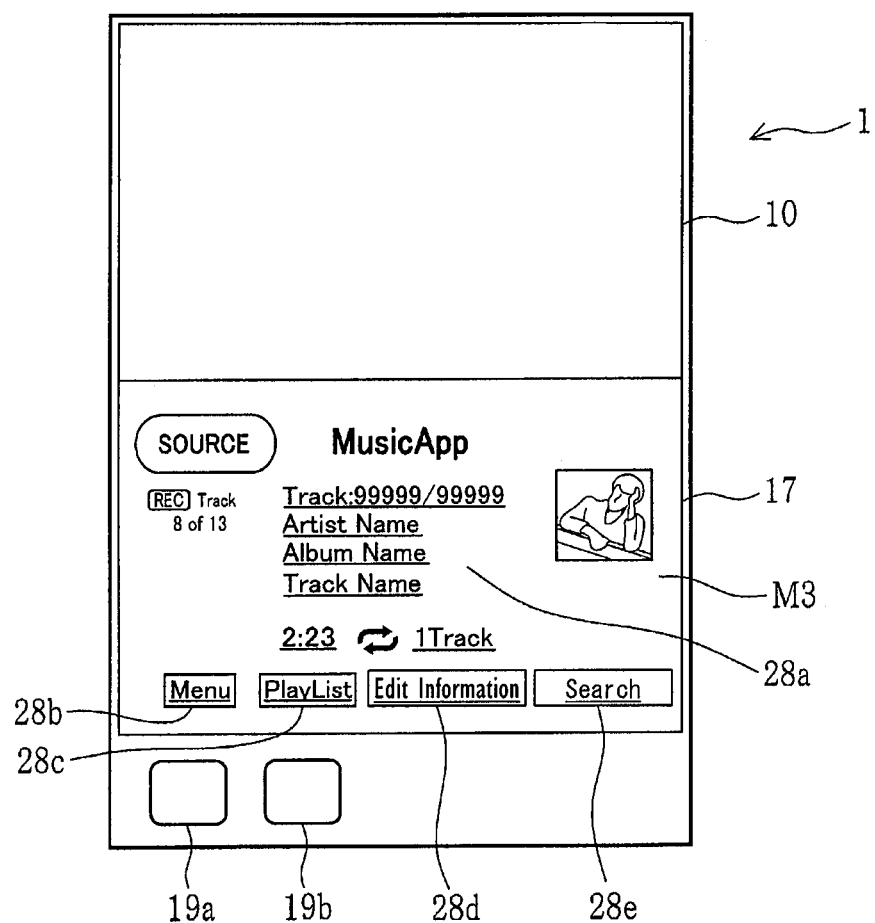
FIG. 7 is a diagram illustrating a general purpose application window of the general purpose middleware.

When the dedicated middleware 21 receives the startup completion notice from the general purpose middleware 22, and determines that the startup of the general purpose middleware 22 is completed (S6: YES), the dedicated middleware 21 transmits a display request to the general purpose middleware 22 through the interface 23 (S8), and waits for reception of the display window data from the general purpose middleware 22 (S9). When the dedicated middleware 21 determines a reception of the display window data from the general purpose middleware 22 (S9: YES), the dedicated middleware 21 decodes the received display window data, and displays (draws) a general purpose application display window (music application window) M3 of the general purpose middleware 22 on the second display unit 17 as illustrated in FIG. 7 (S10, second procedure). The general purpose application display window M3 of the general purpose middleware 22 is a window of the general purpose application 25 including the display window data that has been transferred from the general purpose middleware 22 through the interface 23. The dedicated middleware 21 displays information (artist name or album name) 28a on music being reproduced, a menu key 28b, a play list key 28c, a music information edition key 28d, and a music search key 28e on the general purpose application display window M3 of the general purpose middleware 22. In other words, when the startup of the general purpose middleware 22 is completed, the user can acquire information on the music being reproduced or edit the music information.

Meanwhile, when determining that the audio key 19a is operated by the user (S5), the dedicated middleware 21 determines that the startup of the general purpose middleware 22 is completed at that time (S6: YES). In this case, the dedicated middleware 21 promptly displays the general purpose application display window M3 of the general purpose middleware 22 on the second display unit 17 without displaying the audio window M2 of the dedicated middleware 21.

Figure 4:
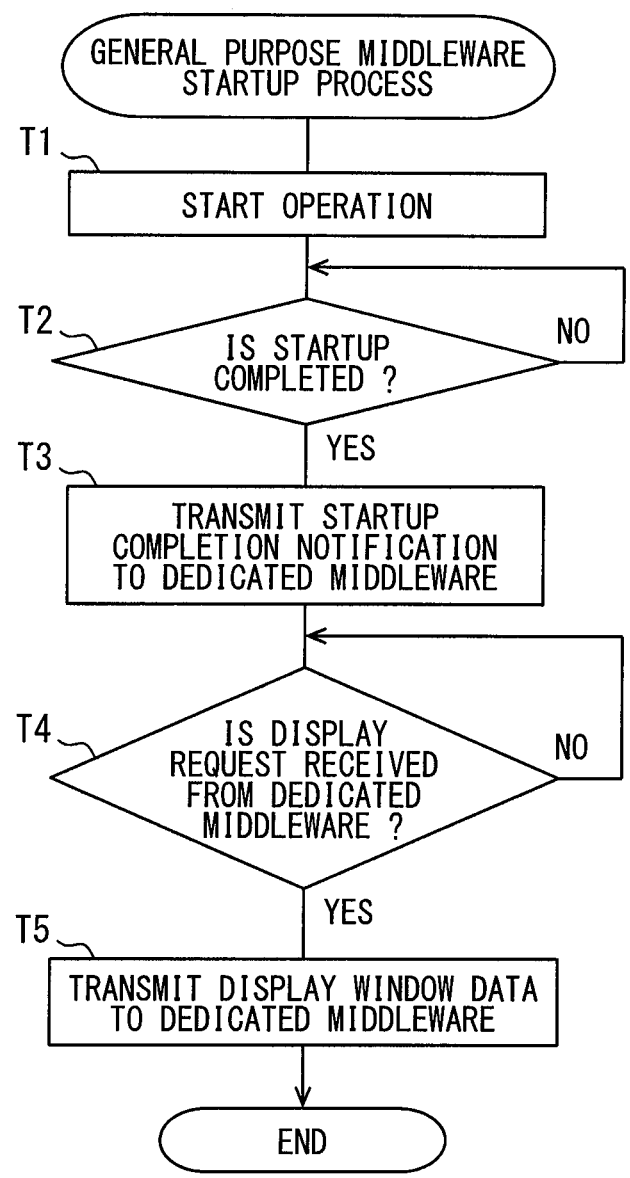
FIG. 4 is a flowchart illustrating a startup process of a general purpose middleware.

(1-2) Process Performed by General Purpose Middleware 22 During Device Startup (Refer to FIG. 4)

When the general purpose middleware 22 starts the startup process upon reception of the startup command from the CPU 9, the general purpose middleware 22 performs a startup operation (T1), specifically, performs a predetermined startup procedure, and waits for the completion of the startup (T2). When the general purpose middleware 22 properly completes the predetermined startup procedure from start to finish, and determines that the startup is completed, the general purpose middleware 22 transmits a startup completion notice indicating that the startup is completed to the dedicated middleware 21 through the interface 23 (T3). The general purpose middleware 22 waits for the reception of the display request from the dedicated middleware 21 (T4). When the general purpose middleware 22 determines a reception of the display request from the dedicated middleware 21 (T4: YES), the general purpose middleware 22 transmits the display window data to the dedicated middleware 21 through the interface 23 (T5).

As described above, the dedicated middleware 21 starts the music application during the device startup, and the dedicated middleware 21 displays the audio window M2 until the startup of the general purpose middleware 22 is completed. As a result, the user can control the operation (reproduction or stop) of the music application even when the startup of the general purpose middleware 22 has not been completed.

Figure 8:
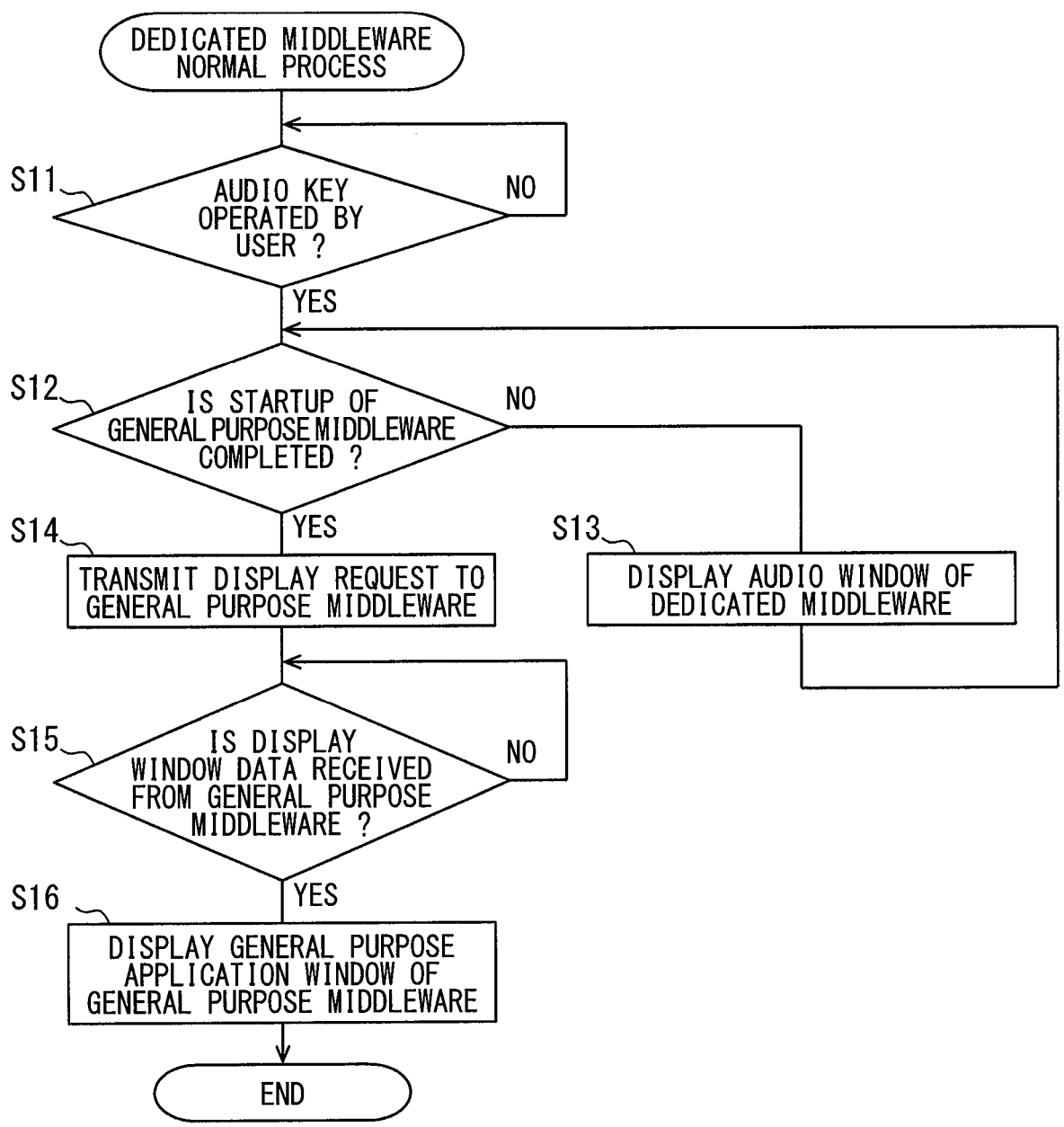
FIG. 8 is a flowchart illustrating a normal process of the dedicated middleware.

(2) During Normal Operation (2-1) Process Performed by Dedicated Middleware 21 During Normal Operation (Refer to FIG. 8)

During normal operation, the dedicated middleware 21 monitors whether the audio key 19a is operated by the user or not (S11), and when the dedicated middleware 21 determines that the audio key 19a is operated by the user (S11: YES), the dedicated middleware 21 determines whether the startup of the general purpose middleware 22 is completed or not (S12).

When determining that the startup of the general purpose middleware 22 is not completed (S12: NO) due to a factor such as the abnormal operation of the general purpose application, the dedicated middleware 21 displays the audio window M2 of the dedicated middleware 21 on the second display unit 17 (S13) and waits for the reception of the restart completion notice from the general purpose middleware 22 similar to the case as illustrated in FIG. 6.

When the dedicated middleware 21 receives the restart completion notice from the general purpose middleware 22 and determines that the startup (restart) of the general purpose middleware 22 is completed (S12: YES), the dedicated middleware 21 thereafter transmits a display request to the general purpose middleware 22 through the interface 23 in the same manner as that at the time of starting up the device (S14), and waits for reception of the display window data from the general purpose middleware 22 (S15). When the dedicated middleware 21 determines a reception of the display window data from the general purpose middleware 22 (S15: YES), the dedicated middleware 21 decodes the received display window data and displays (draws) the general purpose application display window M3 of the general purpose middleware 22 on the second display unit 17 (S16).

Figure 9:
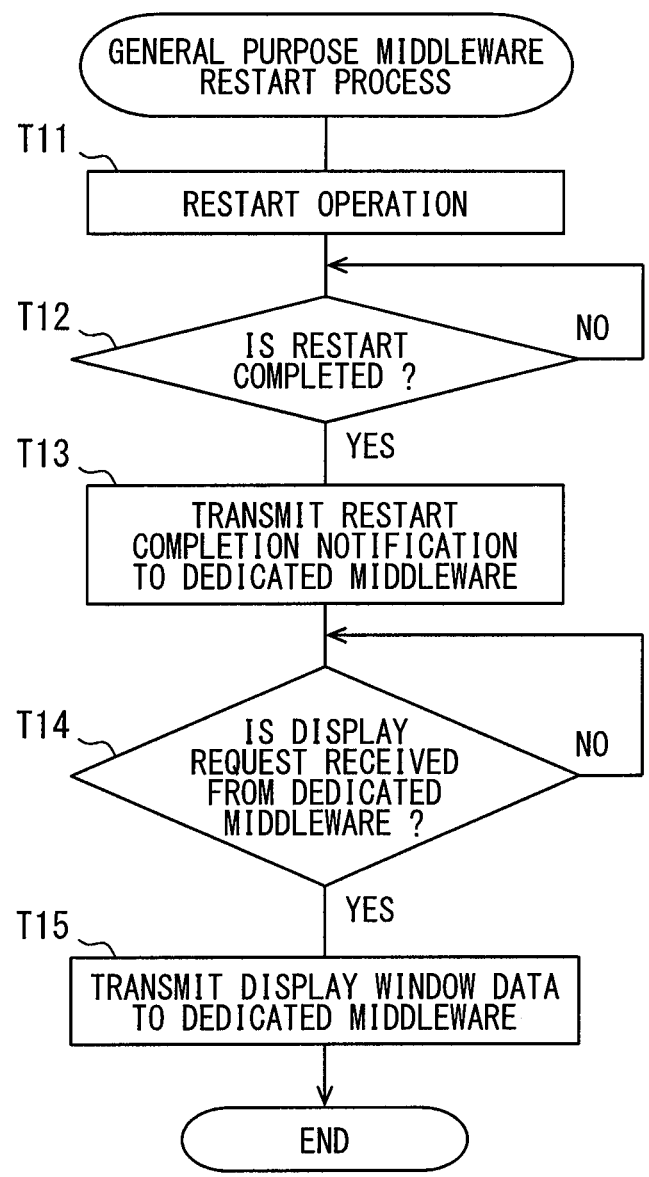
FIG. 9 is a flowchart illustrating a restart process of the general purpose middleware.

(2-2) Process Performed by General Purpose Middleware 22 During Normal Operation (Refer to FIG. 9)

When the general purpose middleware 22 starts the restart process due to a factor such as the abnormal operation of the general purpose application, the general purpose middleware 22 performs a restart operation (T11), specifically, performs a predetermined restart procedure, and waits for the completion of the restart operation (T12). When the general purpose middleware 22 properly completes the predetermined restart procedure from start to finish, and determines that the restart is completed (T12: YES), the general purpose middleware 22 transmits a restart completion notice indicating that the restart is completed to the dedicated middleware 21 through the interface 23 (T13). The general purpose middleware 22 thereafter monitors the reception of the display request from the dedicated middleware 21 (T14). When determining a reception of the display request from the dedicated middleware 21 (T14: YES) in a similar manner with at the time of device startup, the general purpose middleware 22 transmits the display window data to the dedicated middleware 21 through the interface 23 (T15).

As described above, the dedicated middleware 21 displays the audio window M2 until the restart of the general purpose middleware 22 is completed in a case where the general purpose middleware 22 is reset (restarted) due to a factor such as the abnormal operation of the general purpose application 25 after the startup of the general purpose middleware 22 is completed. As a result, the user can control the operation (reproduction or stop) of the music application even before the restart of the general purpose middleware 22 is completed.

The present embodiment described above can provide advantages described below.

In the display control unit 1, for example, during the device startup of the general purpose application 25 or during the abnormal operation of the general purpose application 25, if the startup of the dedicated middleware 21 is completed but the startup of the general purpose middleware 22 is not completed, the dedicated middleware 21 displays the audio window M2 related to the dedicated middleware. As a result, the user operation related to the general purpose application 25 is enabled, and the user who intends to perform an operation to the general purpose application 25 is not required to wait until the startup of the general purpose middleware 22 is completed. With this configuration, a service related to the general purpose application 25 can be provided to the user at an earlier time without waiting. When the startup of the general purpose middleware 22 is completed, the display window of the general purpose application 25 which includes the display window data transferred from the general purpose middleware 22 through the interface 23 is displayed. With this configuration, the information on the general purpose application 25 can be promptly provided to the user.

In the present disclosure, the general purpose application may be an application other than the music application described above.

The present disclosure also provides a display control program product including instructions to be implemented by a computer and stored in a computer-readable non-transitory tangible storage medium. Specifically, the display control program product is to be executed by a computer included in a display control unit. The display control unit includes a dedicated middleware 21 that executes a dedicated application program 24 on vehicle side, a general purpose middleware 22 that executes a general purpose application 25, and an interface 23 that exchanges data between the dedicated middleware and the general purpose middleware. The dedicated middleware 21 has a function of promoting the general purpose middleware 22 to start execution of the general purpose application program 25, and performs a window display control of a display unit 17. The display control program product causes the computer to implement instructions for controlling the dedicated middleware 21 to display a window that can accept user operation related to the general purpose application program 25 on the display unit 17 in a state where the startup of the dedicated middleware 21 is completed but and the startup of the general purpose middleware 22 is not completed, and controlling the dedicated middleware 21 to display the display window of the general purpose application program 25 including the display window data transferred from the general purpose middleware 22 through the interface 23 on the display unit when the startup of the dedicated middleware 21 is completed and the startup of the general purpose middleware 22 is also completed.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A display control unit mounted to a vehicle, comprising:
   a dedicated middleware executing a dedicated application program on a vehicle-side as a first music application;
   a general purpose middleware executing a general purpose application program as a second music application;
   an interface exchanging data between the dedicated middleware and the general purpose middleware; and
   a processor;
   wherein:
   upon an ACC switch of the vehicle turning from off to on, the processor starts up the dedicated middleware,
   upon determining that a startup of the dedicated middleware is completed, the dedicated middleware (i) starts up the dedicated application program being the first music application that was in an activated state at a time when the ACC switch of the vehicle was turned from on to off in a previous operation and (ii) reproduces music data that was reproduced at the time when the ACC switch of the vehicle was turned from on to off in the previous operation,
   the dedicated middleware has a function of promoting the general purpose middleware to start an execution of the general purpose application program, and the dedicated middleware performs a window display control of a display unit,
   a startup of the general purpose middleware is started after a startup of the dedicated middleware is started,
   the dedicated middleware determines whether the startup of the general purpose middleware is completed when the startup of the dedicated middleware is completed and the dedicated middleware accepts a user operation indicative of a display request for a window related to the general purpose application program,
   when determining that the startup of the dedicated middleware is completed and the startup of the general purpose middleware is not completed, the dedicated middleware displays, on the display unit, a first audio window of the dedicated middleware (i) which is configured to accept a user's operation related to the second music application being the general purpose application program and (ii) which displays keys to accept the user's operation to control the music data being reproduced including pause and play of the music data, the first audio window continuing to be displayed until the startup of the general purpose middleware is completed, and
   when determining that the startup of the dedicated middleware is completed and the startup of the general purpose middleware is completed, the dedicated middleware displays, on the display unit, a second audio window of the second music application being the general purpose application program, wherein the displayed second audio window of the second music application includes display window data transferred from the general purpose middleware to the dedicated middleware through the interface.

2. The display control unit according to claim 1, wherein the dedicated middleware deals with a music reproduction program as the general purpose application program.

3. The display control unit according to claim 1, wherein the startup of the general purpose middleware is started after the startup of the dedicated middleware is completed.

4. The display control unit according to claim 1, further comprising:
hardware including the processor
software including a general purpose platform implemented on the hardware including the processor, wherein
the software further includes the general purpose middleware, the dedicated middleware, and the interface, all of which are implemented on the general purpose platform.

5. The display control unit according to claim 4, wherein:
upon determining that the startup of the general purpose middleware is not completed at a time of accepting the user operation indicative of the display request for the window related to the general purpose application program, the dedicated middleware displays the first audio window of the dedicated middleware, the first audio window continuing to be displayed until the startup of the general purpose middleware is completed; and
upon determining that the startup of the general purpose middleware is completed at the time of accepting the user operation indicative of the display request for the window related to the general purpose application program, the dedicated middleware promptly displays the second audio window of the second music application being the general purpose application program without displaying the first audio window of the dedicated middleware.

6. The display control unit according to claim 1, wherein the dedicated middleware additionally executes an air conditioning application for providing an air conditioning function, a phone application for providing a phone function, and a navigation function for providing a navigation function.

7. The display control unit according to claim 6, wherein the general purpose middleware additionally executes a social network application, a communication application, and a web search application.

8. A display control program product stored in a computer-readable non-transitory tangible storage medium, the display control program product comprising instructions to be executed by a computer included in a display control unit mounted to a vehicle, wherein the display control unit includes:

a dedicated middleware executing a dedicated application program on a vehicle-side as a first music application;
a general purpose middleware executing a general purpose application program as a second music application; and
an interface exchanging data between the dedicated middleware and the general purpose middleware, the dedicated middleware having a function of promoting the general purpose middleware to start an execution of the general purpose application program and performing a window display control of a display unit, and a startup of the general purpose middleware being started after a startup of the dedicated middleware is started,
the instructions comprised in the display control program product for implementing:
upon an ACC switch of the vehicle turning from off to on, starting up the dedicated middleware;
upon determining that a startup of the dedicated middleware is completed, (i) starting up, by the dedicated middleware, the dedicated application program being the first music application that was in an activated state at a time when the ACC switch of the vehicle was turned from on to off in a previous operation, and (ii) reproducing the music data that was reproduced at the time when the ACC switch of the vehicle was turned from on to off in the previous operation;
controlling the dedicated middleware to determine whether the startup of the general purpose middleware is completed when the startup of the dedicated middleware is completed and the dedicated middleware accepts a user operation indicative of a display request for a window related to the general purpose application program;
when determining that the startup of the dedicated middleware is completed and the startup of the general purpose middleware is not completed, controlling the dedicated middleware to display, on the display unit, a first audio window of the dedicated middleware (i) which is configured to accept a user's operation related to the second music application being the general purpose application program and (ii) which displays keys to accept the user's operation to control the music data being reproduced including pause and play of the music data, the first audio window continuing to be displayed until the startup of the general purpose middleware is completed; and
when determining that the startup of the dedicated middleware is completed and the startup of the general purpose middleware is completed, controlling the dedicated middleware to display, on the display unit, a second audio window of the second music application being the general purpose application program, wherein the displayed second audio window of the second music application includes display window data transferred from the general purpose middleware to the dedicated middleware through the interface.

* * * * *